(12) United States Patent
Kuebelbeck

(10) Patent No.: US 8,163,260 B2
(45) Date of Patent: Apr. 24, 2012

(54) PROCESS FOR THE PRODUCTION OF MONODISPERSE SIO₂ PARTICLES

(75) Inventor: Armin Kuebelbeck, Bensheim (DE)

(73) Assignee: Merck Patent GmbH, Darmstadt (DE)

( * ) Notice: Subject to any disclaimer, the term of this patent is extended or adjusted under 35 U.S.C. 154(b) by 1186 days.

(21) Appl. No.: 10/592,017

(22) PCT Filed: Feb. 10, 2005

(86) PCT No.: PCT/EP2005/001323
§ 371 (c)(1),
(2), (4) Date: Sep. 7, 2006

(87) PCT Pub. No.: WO2005/085135
PCT Pub. Date: Sep. 15, 2005

(65) Prior Publication Data
US 2008/0241044 A1    Oct. 2, 2008

(30) Foreign Application Priority Data
Mar. 8, 2004    (DE) .................. 10 2004 011 110

(51) Int. Cl.
*C01B 33/12* (2006.01)
*C04B 14/04* (2006.01)
(52) U.S. Cl. ........................................ 423/335; 106/481
(58) Field of Classification Search .................. 423/335, 423/339, 338, 610, 608, 625, 336; 106/481
See application file for complete search history.

(56) References Cited

U.S. PATENT DOCUMENTS

| 3,634,588 | A | | 1/1972 | Steitz et al. |
| 3,922,392 | A | * | 11/1975 | Kohlschutter et al. ........ 427/215 |
| 4,775,520 | A | * | 10/1988 | Unger et al. .................. 423/335 |
| 4,911,903 | A | | 3/1990 | Unger et al. |
| 5,626,964 | A | * | 5/1997 | Blizzard et al. ............... 428/412 |
| 5,932,168 | A | * | 8/1999 | Su .................................. 264/621 |
| 6,302,926 | B1 | * | 10/2001 | Anselmann et al. ........ 23/313 R |
| 2003/0087102 | A1 | * | 5/2003 | Yamaya et al. ............... 428/419 |
| 2003/0124564 | A1 | * | 7/2003 | Trau et al. .......................... 435/6 |

FOREIGN PATENT DOCUMENTS

| DE | 35 34 143 A1 | | 4/1987 |
| EP | 0 216 278 B1 | | 4/1987 |
| EP | 1 036 763 A1 | | 4/1987 |
| EP | 1 036 763 B1 | | 9/2000 |
| EP | 1036763 | * | 9/2000 |
| JP | 2003002632 | | 1/2003 |

OTHER PUBLICATIONS

Translation of German patent, EP 1036763 (Teller et al.) Sep. 2000.*
International Search Report of PCT EP2005/001323 dated May 2, 2005.

* cited by examiner

*Primary Examiner* — Jerry Lorengo
*Assistant Examiner* — Pegah Parvini
(74) *Attorney, Agent, or Firm* — Millen, White, Zelano & Branigan, P.C.

(57) ABSTRACT

The present invention relates to processes for the production of monodisperse SiO₂ particles by hydrolytic polycondensation of tetraalkoxysilanes and/or organotrialkoxysilanes, in which the hydrolytic polycondensation is carried out in a medium comprising water, one or more solubilizers and one or more amines, and in which highly monodisperse, non-porous particles are obtained. The present invention likewise relates to powders obtainable by the processes, and to the use thereof.

24 Claims, No Drawings

PROCESS FOR THE PRODUCTION OF MONODISPERSE $SiO_2$ PARTICLES

The present invention relates to processes for the production of monodisperse $SiO_2$ particles by hydrolytic polycondensation of tetraalkoxysilanes and/or organotrialkoxysilanes, in which the hydrolytic polycondensation is carried out in a medium comprising water, one or more solubilisers and one or more amines, and in which highly monodisperse, non-porous particles are obtained. The present invention likewise relates to powders obtainable by the processes according to the invention and to the use thereof.

Spherical $SiO_n$ particles attract particular interest as valuable assistants in the industrial/scientific sector and as interesting scientific objects of study. A main area of application of particles of this type, in particular if they are of defined and uniform size, principally in the nm and μm range, is their use in standardisation, for example as calibration standards for determining the size of small objects, such as dust particles or cells. A further area of application that comes into consideration is the use as sorption or support material in the field of chromatography and the separation techniques derived therefrom. In all applications of this type, particle size and particle size distribution play a considerable role, and it is consequently important to be able to produce particles of this type in a predictable, reproducible manner with respect to these characteristics.

It is known from the prior art that spherical $SiO_2$ particles can be obtained by hydrolytic polycondensation of tetraalkoxysilanes, for example from the publications by W. Stöber et al. in J. Colloid and Interface Science 26, 62 (1968) and 30, 568 (1969) and U.S. Pat. No. 3,634,588, which reveal the basic reaction conditions for this purpose. These propose introducing tetraalkoxysilane into an excess of an aqueous/alcoholic/ammoniacal hydrolysis mixture, with intensive mixing being ensured by suitable measures, such as stirring, shaking or ultrasound treatment. Depending on the choice of the specific experimental parameters, $SiO_2$ particles of different mean particle size and varying particle size distribution can be obtained here. According to the cited publications, $SiO_2$ particles having mean particle sizes of between 0.05 and 2 μm (in individual cases up to about 3 μm) were obtained, with the influence of various silicic acid esters, of ammonia and water concentration and of various alcohols in the hydrolysis mixture being investigated.

EP 1 036 763 discloses a process for the production of coloured and fluorescent polysilicic acid particles. Ammonia is again the main component in the hydrolytic polycondensation in the processes described therein.

In the above-mentioned processes, the high volatility of ammonia proves to be problematical, in particular if the processes are carried out at elevated temperatures. In contrast to other gases, for example hydrogen chloride gas, ammonia gas does not form an azeotrope with water. It is a physical law known to the person skilled in the art that gases dissolve considerably better in cold liquids than in warm liquids. In the hydrolysis of tetraalkoxysilanes, the pH is an important parameter for carrying out the reaction and should be kept as constant as possible throughout the reaction. In particular at elevated temperatures, this requirement cannot be observed with ammonia in the solution. The ammonia content in the solution changes continuously and thus so does the pH of the solution. Neither can a closed reactor provide a remedy here, since the ammonia gas accumulates above the liquid level. This problem is exacerbated, in particular, if the plant configuration is changed or the reaction is scaled up into larger reaction vessels. Besides the surface/volume ratio, other parameters, such as, for example, the routing of the exhaust air, are also modified in the process. All this results in poorly reproducible results, which are reflected, in particular, in the particle diameter and in the particle size distribution.

The object was therefore to find processes for the production of monodisperse $SiO_2$ particles which do not have the above-mentioned disadvantages. Surprisingly, it has been found that the processes according to the invention meet the above-mentioned complex requirements.

The invention therefore relates to processes for the production of spherical $SiO_2$ particles by hydrolytic polycondensation of tetraalkoxysilanes and/or organotrialkoxysilanes, in which the hydrolytic polycondensation is carried out in a medium comprising water, one or more solubilisers and one or more amines, and in which highly monodisperse, non-porous particles are obtained.

The present invention furthermore relates to powders consisting of spherical $SiO_2$ particles obtainable by the processes according to the invention, and to the use thereof, for example as sorption material in chromatography, for the isolation and purification of nucleic acids and proteins, in phagocytosis analyses, as constituents in diagnostic arrays, as solid phases for the investigation of molecular recognition phenomena and in heterogeneously catalysed processes, as component of photonic crystals and as lubricants and/or polishing agents.

The processes according to the invention have the advantage that the use of amines enables the hydrolytic polycondensation to be carried out independently of the reaction temperature. The concentration of the amines in the reaction medium remains constant, enabling reproducible reactions which are simple to scale up to be carried out at the desired reaction temperature. In this way, powders comprising $SiO_2$ particles can be produced with a uniform and reproducible particle size or particle size distribution. In addition, the amines prove to be effective bases, i.e. only small amounts of the corresponding amines are necessary for carrying out hydrolysis. Furthermore, the amines preferably employed are inexpensive, industrial-scale products, which in addition do not have emission problems during performance of the process, in particular in the exhaust air. A further advantage which has become apparent is that, in contrast to hydrolysis in ammoniacal medium, only slight coating of the reaction vessel wall occurs, which, as side reaction, results in a reduction in yield. The processes according to the invention thus represent an inexpensive alternative to the known processes from the prior art which, besides simplified performance of the reaction, are distinguished by reproducibility and improved yields. Since the organic bases used are obtainable in anhydrous form, in contrast to ammoniacal solutions, specific performance of the reaction with equivalent molar amounts of water for the hydrolysis is furthermore possible, i.e. when hydrolysis is complete, all the water added has reacted, and the reaction product is ideally in the form of a substantially anhydrous suspension. This is particularly advantageous for subsequent functionalisation of the surface of the $SiO_2$ particles formed with trialkoxysilanes or trichlorosilanes. The silanes can be added to the suspension immediately after the precipitation without removal of the particles or complex removal of the water using entraining agents. The interfering side reaction, hydrolysis of the silanes with water without coating the particles, is circumvented here in an ideal manner.

In the simplest embodiment of the processes according to the invention, the monodisperse $SiO_2$ particles are produced in a so-called one-pot process, which is simple to carry out and comprises simple mixing of the individual components. To this end, the tetraalkoxysilane and/or organotrialkoxysilane is introduced into a medium suitable as hydrolysis mixture, comprising water, one or more solubilisers and one or more amines and mixed intimately. Suitable tetraalkoxysilanes which can be employed are all readily hydrolysable orthosilicates of aliphatic alcohols. Primarily suitable here are the esters of aliphatic alcohols having from 1 to 5 carbon atoms, i.e. the alkoxy group can be a methoxy, ethoxy, propoxy, butoxy or pentoxy group, with the respective isomers being taken into account. The above-mentioned tetraalkoxysilanes can be employed individually, but also in the form of a mixture. Preference is given to the use of the orthosilicates of $C_1$-$C_3$-alcohols, in particular tetraethoxysilane. Suitable solubilisers are basically all solvents which are miscible with tetraalkoxysilanes and/or organotrialkoxysilanes and water to an unlimited or even limited extent. Corresponding solubilisers can be selected from the group consisting of alcohols, ketones, dialkyl sulfoxides, pyrrolidones, alkyl nitriles, furans and/or dioxanes. Examples of the said solubilisers are acetone, tetrahydrofuran, dimethyl sulfoxide, 1-methyl-2-pyrrolidone, 1,4-dioxane or acetonitrile. The solubilisers are preferably alcohols, with aliphatic $C_1$-$C_5$-alcohols being particularly suitable as the alcohol component. Preference is given to the use of $C_1$-$C_3$-alcohols, such as methanol, ethanol, n- or i-propanol and 1- or 2-butanol. These can be present in the hydrolysis mixture individually, but also in the form of a mixture with one another. The one or more amines can be selected from the group consisting of primary, secondary and tertiary organic amines. The amines are preferably alkanolamines, diamines, polyamines and/or primary alkylamines, in particular aminoethanol, ethylenediamine, octylamine or diethylenetriamine. The proportion of the amine in the medium suitable as hydrolysis mixture is from 0.1 to 5% by weight, preferably from 0.5 to 3% by weight.

The tetraalkoxysilane is preferably added to the hydrolysis mixture in one portion, where the reactant can be in pure form or alternatively in solution in one of the said solubilisers. Overall, this process variant is carried out using reaction mixtures which comprise from about 2 to 25% by weight of water, from 0.1 to 5% by weight, preferably from 0.5 to 3% by weight, of amine, from 70 to 90% by weight of solubiliser and from 2 to 40% by weight, preferably from 5 to 15% by weight, of tetraalkoxysilane, based on the mixture as a whole. After the reactants have been combined, the reaction commences immediately or after a few minutes, which is evident from immediate opalescence or clouding of the reaction mixture due to the particles being formed. The reaction is complete after in general not more than 15-30 minutes, in unfavourable special cases also longer. Depending on the choice of the reactants and their concentrations in the reaction mixture, particles having mean diameters of between about 0.01 and about 10 µm can be obtained, in agreement with the process known from the prior art. The hydrolytic polycondensation is carried out at temperatures between 25 and 78° C., preferably between 30 and 75° C. and in particular between 40 and 55° C.

In a further embodiment of the processes according to the invention, a seed growing process is employed in which a sol of primary particles is firstly produced, and the resultant $SiO_2$ particles are subsequently brought to the desired particle size in such a way that further nucleation is pre-vented by continuous metered addition of corresponding silane controlled to the extent of reaction. This process variant has the advantage that it allows particularly good monitoring and control of the size of the $SiO_2$ particles. In a first step of the embodiment according to the invention, a sol of primary particles is firstly produced. In order to produce the primary particles, a concentration of tetraalkoxysilane in the hydrolysis mixture of between about 2 and about 40% by weight, preferably in the range from 5 to 15% by weight, based on the mixture as a whole, can be selected. This gives primary particles having mean diameters of between 0.01 and 1 µm. At this stage, samples can be taken from the sol of primary particles in order to analyse the particles, for example with the aid of electron microscopy, for their particle size, shape accuracy and particle size distribution and to determine the porosity of the primary particles, for example by gas adsorption measurement.

It has proven advantageous likewise to carry out the reaction for the production of the primary particles at elevated temperature. Favourable temperatures here are between 25 and 78° C., preferably between 30 and 75° C. and in particular between 40 and 55° C. It has been found that the particle size scatter decreases at elevated temperature, although so does the mean particle size. At lower temperatures, i.e. around room temperature, relatively large particles with greater size scatter are obtained under otherwise identical conditions. Furthermore, undesired agglomeration is also increasingly noted here.

In the second step of the process variant according to the invention, slow, continuous metered addition of further tetraalkoxysilane to the sol of primary particles is carried out with uniform mixing. It is essential here that the rate of metered addition is controlled in such a way that immediate, complete reaction with the particles present in the sol takes place without an excess of tetraalkoxysilane forming, from which nuclei for new primary particles are able to form. With this process measure of metered addition of tetraalkoxysilane controlled to the extent of reaction, controlled subsequent growth of the particles in the sol is achieved, with the particle size ultimately to be achieved depending on the amount of tetraalkoxysilane added in total. The amount of alkoxysilane to be added in total is in principle not crucial so long as the hydrolysis mixture is present in excess or is kept in excess by topping up of hydrolysis mixture if necessary. A time limit is not set during addition of the tetraalkoxysilane; the addition can extend over hours to days. Interruptions and recommencement of the subsequent growth are also possible, since the particles are stable at all stages of their growth. The subsequent growth operation is also preferably carried out at elevated temperature, for example about 40° C. The lower particle size should be set at about 0.05 µm, due to the minimum size of the primary particles. It is amazing and completely unexpected that the broader particle size scatter present in the case of the primary particles—the standard deviations there are on average 5-25%—does not recur in the particles obtainable with the subsequent growth step. The particles obtained in this way have standard deviations of not more than 20%, preferably of not more than 10% and particularly preferably of not more than 5%, i.e. are highly monodisperse. In this second step, there appears to be increasing similarity of the particles of different size originally present and uniform further growth of all particles present with a corresponding reduction in the relative standard deviation.

It is found that the particles obtained by the above-mentioned processes according to the invention have a uniform spherical shape and have no porosity at all. Their specific surface area, determined by gas adsorption measurement, is found to be 1 to 1.5 times the surface area which can be calculated theoretically, which at best allows the conclusion of a slight surface roughness, but excludes the presence of pores. It is assumed that the slow, continuous subsequent growth closes pores originally present in the primary particles, and new pores are not able to form.

In a further embodiment of the above-mentioned process variants according to the invention, it is possible also to produce particles which have been organically modified in the matrix, i.e. contain covalently bonded organic groups. Processes of this type are known in principle. To this end, from 0.1 to 100%, preferably 1-30%, of the tetraalkoxysilane employed are replaced in the processes according to the invention, in the seed growth process preferably in the subsequent growth step, by one or more organotrialkoxysilanes, as are known, for example, for the modification of silica gels. The organo groups in these compounds can be aliphatic radicals having 1-20 carbon atoms, optionally functionalised, for example by hydroxyl, thio, amino or carboxyl groups or halogen and alkenyl radicals. The incorporation of functionalised organo groups into the $SiO_2$ matrix of the particles furthermore facilitates later further modification by formation of covalent bonds in a known manner. Examples of organotrialkoxysilanes of this type are, for example, methyltriethoxysilane, ethyltriethoxysilane, hexyltriethoxysilane, octyltriethoxysilane, dodecyltriethoxysilane, octadecyltriethoxysilane, vinyltriethoxysilane, 3-hydroxypropyltriethoxysilane, 3-chloropropyltriethoxysilane, 3-aminopropyltriethoxysilane, 3-glycidoxypropyltriethoxysilane, 3-mercaptopropyltriethoxysilane, 3-isothiocyanatopropyltriethoxysilane, 3-(aminoethylamino)propyltriethoxysilane, 3-methacryloxypropyltriethoxysilane, 3-acetoxypropyltriethoxysilane, N-(3-triethoxysilylpropyl)-N'-(1-phenyl-1-hydroxyisopropyl)thiourea, N-(3-triethoxysilylpropyl)-N'-(1-phenylethyl)thiourea or mixtures thereof.

An organic modification of this type does not influence the properties of the particles with respect to non-porosity and monodispersity, while, in addition, the known, advantageous properties of modified silica gels are evident. Unmodified $SiO_2$ particles produced by the process according to the invention can of course also be organically surface-modified by subsequent treatment by processes as are known for porous materials (for example in the production of reversed-phase chromatography sorbents).

In a further embodiment of the processes according to the invention, one or more dyes, in particular fluorescent dyes, are additionally added during the hydrolytic polycondensation. The dye is preferably a terminally silylated (fluorescent) dye. The terminally silylated (fluorescent) dye has the general formula $R^1R^2R^3SiR^4$, in which $R^1$, $R^2$ and $R^3$ are identical or different and stand for halogen atoms, alkyl, aryl, alkoxy or silyloxy groups, and $R^4$ has the complex structure $A^1$-$B_m$-$C_n$-$A^2$, in which m and n can adopt the values zero and 1. $A^1$ here denotes an alkyl chain or a heteroanalogous structure, preferably having from 1 to 20 chain members. B stands for a functional sequence, which in the individual case can denote carbonyl, oxycarbonyl, aminocarbonyl or aminothiocarbonyl groups or a hetero atom, for example oxygen, nitrogen or sulfur. C stands for a bifunctional organic sequence having a chain or ring structure which is linked to $A^2$ in a suitable manner. It is preferably an alkylene unit or substituted and heteroanalogous alkylene groups which are in each case linked to $A^2$ via a carbon, nitrogen, oxygen or sulfur atom, for example as an ester or amide. This means that the bifunctional sequence C in $R^4$ can also stand for structural elements of hydroxy- or aminocarboxylic acids and esters and amides thereof. $A^2$ in the general formula $R^4=A^1$-$B_m$-$C_n$-$A^2$ stands for a fluorophoric system or a dye molecule which structurally offers the possibility of bonding to C or, if n is equal to zero, to B or, if m and n are equal to zero, to $A^1$. In order to achieve this bonding behaviour, the structural element $A^2$ contains one or more functional groups which are accessible to the conventional reaction schemes of substitution or addition. In the individual case these are carboxylic or sulfonic acid groups or activated derivatives thereof, nucleophilic radicals, such as hydroxyl, mercapto or amino groups, structures which contain substitutable halogen atoms, such as haloalkyl, haloalkylcarbonyl or haloacyl radicals, epoxide sequences or analogous systems or heterocumulenes, such as isocyanates or isothiocyanates, or multiple-bond systems activated in another way. It is likewise possible to use reactive textile dyes, for example of the Cibacron type, which contain reactive chlorotriazinyl substructures, to build up the bonding sequence in $R^4$. $A^2$ contains no structural restrictions for suitability as chromophoric system. All common chromophores or fluorophores, such as benzoidal and quinoidal aromatic and heteroaromatic compounds, for example triarylmethanes, anthraxquinones, chromenes, xanthenes, indoles, quinolines, acridines, phenoxazines, phenothiazines and phenazines, but also azo and stilbene dyes, indigo derivatives, phthalocyanines and other tetrapyrrole dyes, as well as polymethines (cyanines), can be incorporated into a polysilicic acid matrix by the process according to the invention. The alkoxy group in $R^1$, $R^2$ and/or $R^3$ can be a methoxy, ethoxy, propoxy, butoxy or pentoxy group, preferably an ethoxy group.

From the chemical synthesis point of view, the linker sequence $A^1$-$B_m$-$C_n$-$A^2$ can be built up in one or more steps. It has proven favourable to carry out the synthesis steps as one-pot variants. It cannot be excluded here that, due to the nature and number of the functional groups in the participating reactants, constitutional isomers or multiple bonds can occur, although this is unimportant for the objective of homogeneous particle colouring. The addition and substitution reactions necessary to build up the linker sequence $A^1$-$B_m$-$C_n$-$A^2$ are carried out in solvents which are compatible with the hydrolysis mixture during particle formation. These include, for example, water, alcohols and ethers and in particular dipolar aprotic solvents, such as acetone, acetonitrile, N,N-dimethylformamide, N-methylmorpholine oxide and dimethyl sulfoxide. However, it is also possible to start in relatively nonpolar solvents, for example in (halogenated) hydrocarbons, to evaporate these solvents and to transfer the residue into one of the above-mentioned solubilisers. It is thus ensured that hydrolysis-sensitive reactants and intermediates can also be used for building up the linker sequence $A^1$-$B_m$-$C_n$-$A^2$.

In the process of particle formation, the terminally silylated (fluorescent) dyes of the general formula $R^1R^2R^3SiR^4$ can be used either as isolated chemical compounds or as in-situ synthesis products.

In general, purification and characterisation of the terminally silylated (fluorescent) dyes themselves and of the requisite reactive intermediates can be omitted here, although they are in principle possible and using conventional means and methods.

In order to achieve a homogeneous distribution of the (fluorescent) dye during particle formation, matched reactivity and a suitable ratio of the tetraalkoxysilane and terminally silylated (fluorescent) dye precursors are necessary. For this reason, use is principally made of precursors which contain ethoxy substituents on the silicon. Depending on the (fluorescent) dye type, the derivatisation thereof and the application of the polysilicic acid particles to be synthesised, the ratio of the precursors can vary relatively greatly and is usually between 0.01 and 5 mol %.

The process according to the invention also enables colour nuances and multiple colourings to be achieved. To this end, a plurality of precursors of the general formula $R^1R^2R^3SiR^4$ which differ in the constitution of the linked sequence $A^1$-$B_m$-$C_n$-$A^2$ and in the chemical structure of the fluorophoric system or of the dye $A^2$ are metered in simultaneously or successively during particle formation. However, it has proven favourable to restrict the number of terminally silylated (fluorescent) dyes which differ with respect to the chemical structure of the fluorophoric system or of the dye $A^2$ to 2 to 3.

The copolycondensation between the tetraalkoxysilane and/or organotrialkoxysilane and terminally silylated (fluorescent) dye precursors can likewise be carried out by standard methods in a stirred reactor thermostatted at from 25° C. to 78° C.

In some cases, it has proven appropriate or necessary to add further additives besides various precursors to the hydrolytic polycondensation reaction. Thus, various surfactants can build up microemulsions as reaction volumes or stabilise particle dispersions. Stabilising effects of this type can also emanate from metal salts which are effective as peptisers. If the aim in the copolycondensation is to replace the polysilicic acid matrix proportionately by analogous structures, such as aluminates or titanates, or to dope it with other metals, this can be carried out by adding additives of the corresponding metal salts, such as, for example, corresponding metal hydroxides, oxides and alkoxides, or coordination compounds and free ligands or combinations resulting therefrom. Additives from the above areas are metered in independently or in a synergistic manner to metal compounds which may already be present in (fluorescent) dye component $A^2$, for example in metal phthalocyanines or colour lakes, according to the dye-containing embodiment.

The above-described embodiment of the process according to the invention thus offers the possibility of producing monodisperse $SiO_2$ particles having adjustable diameters of between 0.05 µm and 10 µm which have a homogeneous and high (fluorescent) dye density or colour/fluorescence intensity. These particles are likewise characterised by pronounced sphericity, low variation coefficients in the size distribution and low porosity of the surface. The process is designed in such a way that the polysilicic acid particles can have a different colour status. Such particle types have the following features in the individual case: simple colouring, additive multiple colouring, fluorescence in a defined wavelength range, optionally also outside the visible region, fluorescence in a plurality of defined wavelength ranges and colouring and fluorescence. An essential advantage of the production process consists in that the resultant particles are elutionstable both in common buffers and also in all conventional solvents. Even on shaking for a number of hours in N,N-dimethylformamide, no significant liberation of (fluorescent) dyes is observed.

$SiO_2$ particles organically modified in this way facilitate applications in numerous other areas, for example as customised sorbents for chromatography.

These organically modified $SiO_2$ particles produced by the process according to the invention are suitable, in particular, for use in reversed-phase chromatography.

Owing to the large variability with respect to the structure, the $SiO_2$ particles produced by the processes according to the invention are suitable as sorption material in chromatography, for the isolation and purification of nucleic acids and proteins, in phagocytosis analyses, as constituents in diagnostic arrays, as solid phases for the investigation of molecular recognition phenomena and in heterogeneously catalysed processes, as component of photonic crystals and as lubricants and/or polishing agents. Accordingly, the present invention likewise relates to powders consisting of spherical $SiO_2$ particles obtainable by one of the processes according to the invention, where the $SiO_2$ particles have a mean particle diameter of between 0.05 and 10 µm.

The use of these particles allows the separation of high-molecular-weight biomolecules, such as, for example, peptides, proteins or nucleic acids.

Molecules of this type are, for example, lysozyme, ribonuclease A, urease, transferrin, insulin, aldolase, myoglobin, catalase, ovalbumin, LDH, PAP, α-chymotrypsin, peroxidase, bovine serum albumin, ferritin, $C_f$-INA, creatin kinase, carboanhydrase, amyl glucosidase, haemoglobin, interleukin, inter alia. On use of the particles produced by the process according to the invention for the separation of biomolecules of this type, advantages arise which have hitherto not been achieved by conventional materials used in this case.

The small mean particle size, the very narrow particle size distribution and the lack of diffusion barrier compared with, for example, porous materials achieve significantly greater efficiency of the columns and thus also a higher detection limit. Further advantages consist in the significantly shorter analysis times, which are approximately a factor of 5 shorter compared with the times needed in the case of conventional materials. Furthermore, the substance losses are significantly lower than on use of porous materials. There are absolutely no restrictions here for the choice of the solvent; all known solvent systems can be employed.

The following examples are intended to explain the invention in greater detail, but without restricting it.

EXAMPLE 1

In a series of experiments, various amines are employed, but the influence of the respective concentration of the amine in the processes according to the invention is also investigated. To this end, the following reaction conditions are selected:

A number of clear mixtures consisting of
7.5 ml of tetraethyl orthosilicate (TEOS)
50 ml of ethanol (absolute) and
18.7 ml of deionised water
are warmed in parallel to 30° C. with stirring using a magnetic stirrer. The amounts of different amines listed in Table 1 are subsequently added.

In a comparative reaction, 11.7 ml of ammonia solution (25% by weight) are added to the mixture, and monodisperse particles having a diameter of 0.5 µm are obtained.

TABLE 1

Results of the experiments

| Hydrolysis agent | Amount [ml] | Diameter of the particles [µm] | Dispersity | Agglomeration | Coating of the wall of the reaction vessels |
|---|---|---|---|---|---|
| Ammonia 25% | 11.7 | 0.5 | mono | none | slightly coated |
| TMAH 25% | 2 | 0.5 | poly | considerable | heavily coated |
| Ethanolamine | 0.5 | approx. 1 | mono | slight | slightly coated |
| Ethanolamine | 2 | approx. 0.6 | mono | yes | not coated |
| Ethylenediamine | 8 | >0.6 | mono | none | slightly coated |

TABLE 1-continued

Results of the experiments

| Hydrolysis agent | Amount [ml] | Diameter of the particles [μm] | Dispersity | Agglomeration | Coating of the wall of the reaction vessels |
|---|---|---|---|---|---|
| Triethylamine | 1 | <0.1 | — | none | — |
| Octylamine | 2 | <0.05 | — | none | not coated |

It is evident from the above-mentioned table that amines and in particular ethanolamine and ethylenediamine are advantageously suitable for the production of monodisperse $SiO_2$ particles in the processes according to the invention.

EXAMPLE 2

Production of Monodisperse Silica Particles with Equimolar Amounts of Water In accordance with the reaction equation

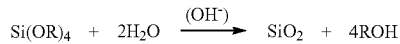

$$Si(OR)_4 + 2H_2O \xrightarrow{(OH^-)} SiO_2 + 4ROH$$

2 mol of water are required per mol of tetraalkyl silicate.

Due to the aqueous nature of the ammonia solution always used in the prior art, it was not possible to add equimolar amounts of water to the reaction. On use of ammonia solution, water is added in significant excess in virtually all cases, even if no additional water is added. Only on addition of extremely small amounts of ammonia solution would this be possible in principle. However, performance of the reaction is extremely disadvantageous in this case.

In the series of experiments shown in Table 1, the amount of water necessary for the hydrolysis is reduced to equimolar amounts with use in accordance with the invention of amines (see above reaction equation). The mixtures are stirred at 40° C. for 3 hours by means of a magnetic stirrer.

The reaction products obtained are measured under a scanning electron microscope.

TABLE 2

Production of monodisperse silica particles with equimolar amounts of water

| # | Hydrolysis agent | Amount [ml] | TEOS [g] or [mol] | Water [ml] or [mol] | Ethanol [ml] | Diameter [nm] *) |
|---|---|---|---|---|---|---|
| 1 | Ethylenediamine | 1 | 10.5//0.05 | 1.8//0.1 | 90 | 70-89 |
| 2 | Ethanolamine | 2 | 10.5//0.05 | 2.5//0.14 | 90 | 45-60 |
| 3 | Ethanolamine | 8 | 10.5//0.05 | 1.8//0.1 | 90 | 72-117 |
| 4 | Ethanolamine | 4 | 21.0//0.1 | 3.6//0.2 | 90 | 81-148 |
| 5 | Ethanolamine | 2 | 10.5//0.05 | 5.0//0.28 | 90 | 84-134 |
| 6 | Ethanolamine | 5 | 42.0//0.2 | 8.0//0.44 | 70 | 50-183 |

*) min-max values of approx. 50 measured particles

The use in accordance with the invention of anhydrous bases enables the reaction to be carried out in such a way that the water necessary for the hydrolysis can specifically be added in equimolar amounts.

The invention claimed is:

1. A process for the production of mono-dispersed, spherical, nonporous $SiO_2$ particles by hydrolytic polycondensation of tetraalkoxysilanes and/or organotrialkoxysilanes, said process comprising:

conducting said hydrolytic polycondensation of tetraalkoxysilanes and/or organotrialkoxysilanes in a medium comprising water, one or more solubilizers, and ethanolamine.

2. A process according to claim 1, wherein a sol of primary particles is first produced, and the resultant $SiO_2$ particles are subsequently brought to the desired particle size in such a way that further nucleation is prevented by continuous metered addition of corresponding silane controlled to the extent of reaction.

3. A process according to claim 1, wherein the proportion of ethanolamine in the medium is from 0.1 to 5% by weight.

4. A process according to claim 1, wherein the one or more solubilizers are in each case an alcohol, a ketone, a dialkyl sulfoxide, a pyrrolidone, an alkyl nitrile, a furan, or a dioxane.

5. A process according to claim 1, wherein the alkoxy group of the tetraalkoxysilane is in each case a methoxy, ethoxy, propoxy, butoxy or pentoxy group.

6. A process according to claim 1, wherein the hydrolytic polycondensation is carried out at temperatures between 25 and 78° C.

7. A powder consisting of mono-dispersed, spherical, nonporous $SiO_2$ particles obtainable by a process according to claim 1.

8. A powder according to claim 7, wherein the $SiO_2$ particles have a mean particle diameter of between 0.05 and 10 μm.

9. A process according to claim 1, wherein the proportion of ethanolamine in the medium is from 0.5 to 2% by weight.

10. A process according to claim 1, wherein the proportion of ethanolamine in the medium is from 0.5 to 3% by weight.

11. A process according to claim 1, wherein the hydrolytic polycondensation is carried out at temperatures between 30 and 75° C.

12. A process according to claim 1, wherein the hydrolytic polycondensation is carried out at temperatures between 40 and 55° C.

13. A process according to claim 1, wherein said medium contains 2-25% by weight water, 0.1-5% by weight ethanolamine, 70-90% by weight solubilizers, and 2-40% by weight tetraalkoxysilane, based on the total weight of the medium.

14. A process according to claim 1, wherein said medium contains 2-25% by weight water, 0.5-3% by weight ethanolamine, 70-90% by weight solubilizers, and 5-15% by weight tetraalkoxysilane, based on the total weight of the medium.

15. A process according to claim 1, wherein one or more dyes are additionally added to the medium during the hydrolytic polycondensation.

16. A process according to claim 15, wherein said dye is a fluorescent dye.

17. A process according to claim 15, wherein said dye is a terminally silylated fluorescent dye of the formula:

$$R^1R^2R^3SiR^4,$$

in which
- $R^1$, $R^2$ and $R^3$ are identical or different and stand for halogen atoms, alkyl, aryl, alkoxy or silyloxy groups,
- $R^4$ has the complex structure $A^1\text{-}B_m\text{-}C_n\text{-}A^2$,
- m and n are each zero or 1,
- $A^1$ is an alkylene chain or a heteroanalogous structure,
- B is a functional sequence,
- C is a bifunctional organic sequence having a chain or ring structure which is linked to $A^2$, and
- $A^2$ is a fluorophoric system or a dye molecule which is bonded to C or, if n is equal to zero, is bonded to B or, if m and n are both equal to zero, is bonded to $A^1$.

18. A process according to claim 17, wherein the functional sequence B in $R^4$ is carbonyl, oxycarbonyl, aminocarbonyl, aminothiocarbonyl, or a hetero atom.

19. A process according to claim 18, wherein the functional sequence B in $R^4$ is carbonyl, oxycarbonyl, aminocarbonyl, aminothiocarbonyl, oxygen, nitrogen or sulfur.

20. A process according to claim 17, wherein the bifunctional sequence C in $R^4$ is an alkylene unit, a substituted alkylene unit, or a heteroanalogous alkylene unit, which in each case is linked to $A^2$ via a carbon, nitrogen, oxygen or sulfur atom.

21. A process according to claim 17, wherein the bifunctional sequence C in $R^4$ is a hydroxy- or aminocarboxylic acid radical, or an ester or amide thereof.

22. A process according to claim 17, wherein the alkoxy group is a methoxy, ethoxy, propoxy, butoxy or pentoxy group.

23. A process according to claim 17, wherein m is 1, and the functional sequence B in $R^4$ is carbonyl, oxycarbonyl, aminocarbonyl, aminothiocarbonyl, or a hetero atom.

24. A process according to claim 17, wherein n is 1, and the bifunctional sequence C in $R^4$ is a hydroxy- or aminocarboxylic acid radical, or an ester or amide thereof.

* * * * *